United States Patent [19]

Rosaen

[11] 4,281,554

[45] Aug. 4, 1981

[54] FLUID FLOW METER

[76] Inventor: Borje O. Rosaen, 4031 Thornoaks Dr., Ann Arbor, Mich. 48104

[21] Appl. No.: 82,672

[22] Filed: Oct. 9, 1979

[51] Int. Cl.³ .............................................. G01F 1/28
[52] U.S. Cl. .................................................. 73/861.71
[58] Field of Search ............... 73/440, 861.55, 861.56, 73/861.71. 861.57; 116/264, 266, 268, 272, 273; 200/81.9 R, 81.9 M; 340/606

[56] References Cited

U.S. PATENT DOCUMENTS

| 1,227,842 | 5/1917 | Sellin | 116/273 |
|---|---|---|---|
| 2,413,352 | 12/1946 | Hulsberg | 73/861.71 |
| 3,057,977 | 10/1962 | Caswell | 73/861.71 |
| 3,150,360 | 9/1964 | Stenzel | 340/606 |
| 3,193,816 | 7/1965 | Brath | 340/606 |
| 3,224,270 | 12/1965 | Karol et al. | 73/861.56 |
| 4,114,607 | 9/1978 | Russo | 128/725 |
| 4,182,347 | 1/1980 | Russo | 128/725 |

Primary Examiner—Herbert Goldstein
Attorney, Agent, or Firm—Gifford, Van Ophem, Sheridan & Sprinkle

[57] ABSTRACT

A fluid flow meter is provided and comprises a tubular and cylindrical housing constructed of a transparent material and having an upper axial end, a lower axial end and defining an interior fluid chamber therebetween. A fluid inlet is fluidly connected to the lower end of the chamber while a fluid outlet is fluidly connected to the upper end of the chamber. At least one and preferably several flow responsive members are disposed and freely moveable within the interior of the fluid chamber. The members have a density greater than the density of the fluid flowing through the flow meter but are vertically displaceable within the interior chamber in an amount proportional to the fluid flow rate through the flow meter. The density and surface area of the members can be varied as desired in order to provide for different flow rates and flow ranges. In addition, in the preferred form of the invention, a magnetically operated switch is adjustably connected to the housing and is actuated by the presence of a flow responsive member at a predetermined vertical level within the fluid chamber and is thus representative of a predetermined flow rate.

12 Claims, 3 Drawing Figures

FLUID FLOW METER

BACKGROUND OF THE INVENTION

I. Field of the Invention

The present invention relates to fluid flow meters.

II. Description of the Prior Art

There have been a number of previously known fluid flow meters which provide an exteriorly visible signal of the fluid flow rate through the flow meter. These previously known flow meters typically include a housing having a fluid inlet, a fluid outlet and means contained in the housing to measure the fluid flow therethrough.

In one type of previously known fluid flow meter, a semi-circular vane is rotatably mounted within the housing and cooperates with a hemispherical wall section having its center offset from the axis rotation of the vane. Thus, rotation of the vane, caused by fluid flow through the flow meter, rotates the vane and creates a fluid flow passage between the outer periphery of the vane and the hemispherical wall. The cross sectional area of this fluid passage increases with the rotation of the vane so that the rotational position of the vane is indicative of the fluid flow rate through the fluid flow meter.

In still another type of previously known fluid flow meter, a piston is axially slidably mounted within a housing and includes a fluid port through which the fluid must flow from the housing inlet into the outlet. A tapered needle is positioned within this fluid port so that the axial displacement of the piston determines the cross sectional area opening of the fluid port. Fluid from through the flow meter axially displaces the piston in an amount proportional to the flow rate and this axial displacement of the piston is used to provide a signal of the fluid flow rate through the fluid flow meter.

These previously known flow meters, however, all suffer a number of common disadvantages. One disadvantage of these previously known flow meters is that they are relatively complex and therefore expensive in construction. Moreover, since these previously known flow meters include parts which move and cooperate with other parts, these flow meters require periodic disassembly and maintenance.

A still further disadvantage of these previously known flow meters is that the flow range for the flow meter is preset and non-adjustable after assembly of the flow meter. Thus, in order to obtain a flow meter with a different flow range, it is necessary to construct a separate and different flow meter.

Many of these previously known flow meters include a switch which is activated when the flow reaches a certain level and the switch, in turn, can be connected to an alarm system or other electrical system. The flow range at which the switch is actuated, however, is not easily adjustable, if adjustable at all, and is usually factory preset. Moreover, even the flow meters in which the flow rate at which the switch is actuated can be adjusted require at least partial disassembly of the flow meter.

SUMMARY OF THE PRESENT INVENTION

The present invention overcomes the above mentioned disadvantages of the previously known fluid flow meters by providing a simple and inexpensive flow meter in which the flow range of the flow meter can be easily set or reset as desired. In addition, the flow meter includes a switch which can be actuated at any desired and adjustable flow rate.

In brief, the present invention comprises a tubular and cylindrical housing constructed of a transparent material such as glass or plexiglass thus forming an elongated and cylindrical interior chamber. A bottom cap is secured over the lower end of the cylindrical housing while an upper cap is similarly secured to the upper end of the cylindrical housing. A fluid inlet is formed through the lower end cap while a fluid outlet is formed through the upper end cap.

At least one and preferably several flow responsive members such as balls are positioned within the interior fluid chamber. The fluid response members have a density greater than the density of the fluid flowing through the flow meter and, as such, normally gravitate to the lower end of the interior chamber adjacent the lower end cap. However, upon fluid flow through the fluid flow meter, the balls are propelled upwardly by the fluid flow within the interior chamber in an amount proportional to the fluid flow rate through the flow meter. Thus, the vertical displacement of the balls, visible through the transparent housing, is representative of the flow rate through the flow meter. If desired, suitable flow rate indicia can be provided on the flow meter housing. Alternatively, the balls can be color coded or bear numbers or indicia representative of the flow rate.

The flow range of the flow meter can be easily and simply set or reset by proper selection of the density and/or size of the balls. For example, relatively large hollow balls could be disposed within the interior chamber when a relatively low flow range is desired while, conversely, small and solid balls can be placed within the interior chamber when a higher flow range is desired.

In the preferred form of the invention, a magnetically actuated switch is axially adjustably secured to the outer periphery of the housing by means of a clamp. One or more of the balls is either made of a magnetic material or includes a magnetic insert which actuates the switch when the balls attain the level of the switch on the housing. Alternatively, of course, the switch itself may contain the magnet while the ball is constructed of a ferric material which attracts and actuates the switch when the ball is propelled to the level of the switch.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PREFERRED EMBODIMENT

Figure 1:
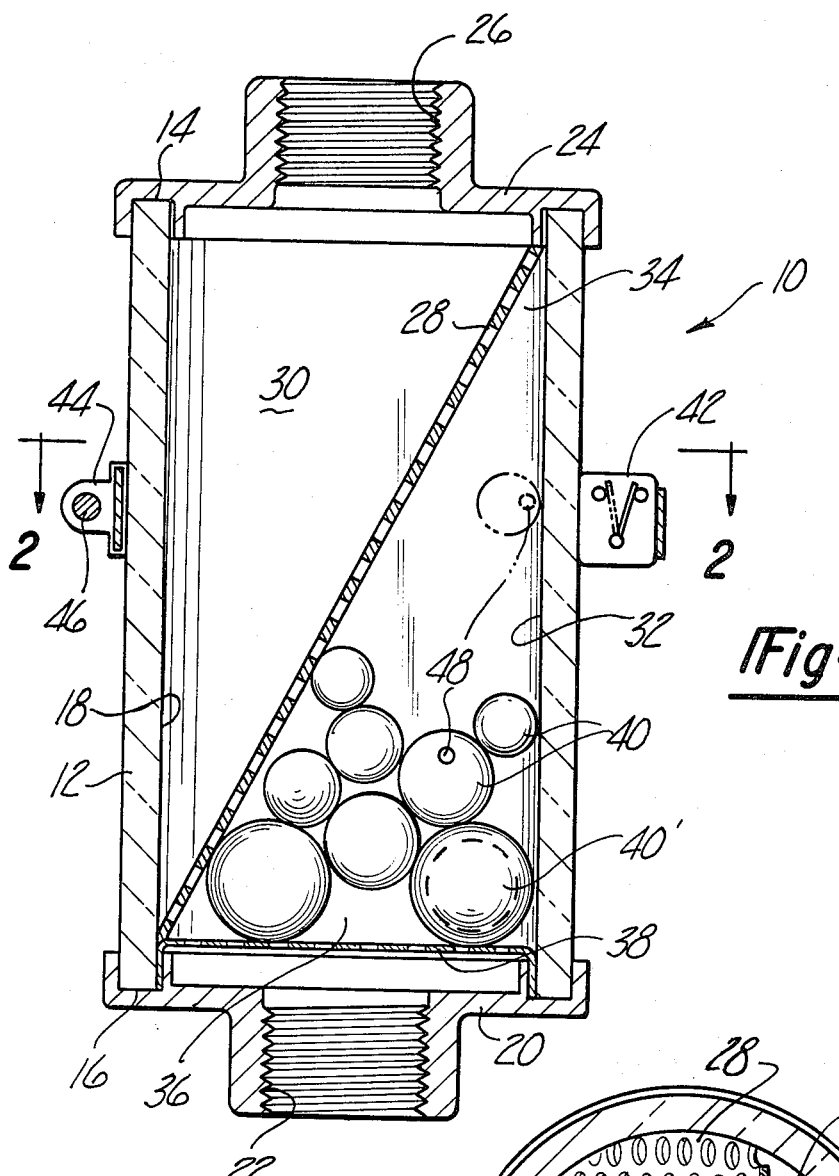
FIG. 1 is a longitudinal sectional view illustrating the flow meter according to the present invention.
Figure 2:
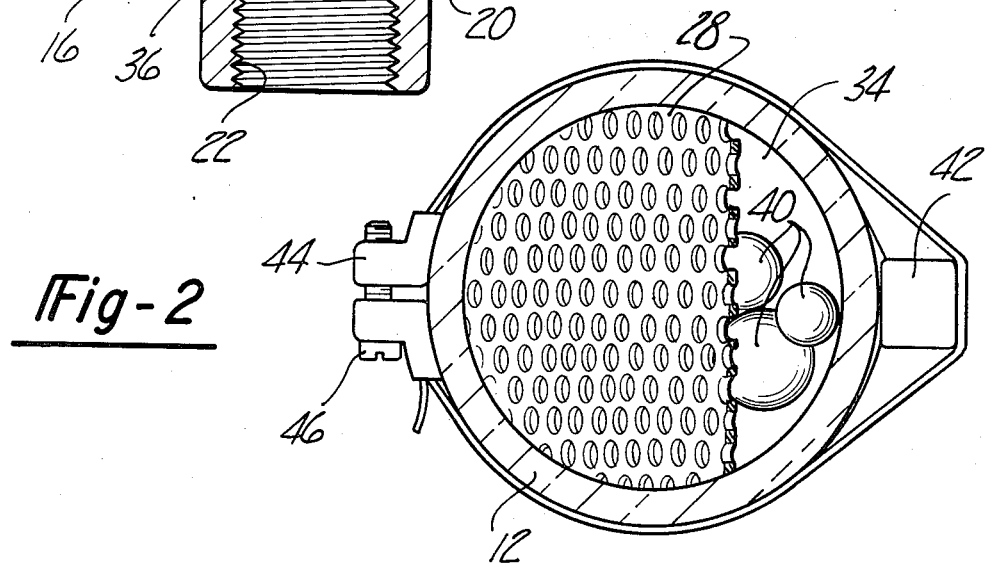
FIG. 2 is a sectional view taken substantially along line 2—2 in FIG. 1.

With reference first to FIGS. 1 and 2, the flow meter 10 according to the present invention is thereshown and comprises a tubular and cylindrical housing 12 having an upper end 14 and a lower end 16. The housing 12 is constructed of a transparent material such as glass or plexiglass and thus defines an interior cylindrical chamber 18 having a generally vertically oriented axis.

A lower circular cap 20 is sealingly secured across the lower end 16 of the housing 12 and includes a fluid port 22 which forms a fluid inlet to the lower end of the chamber 18. The port 22 can be threaded, as shown, for connection with standard fluid fittings.

Similarly, an upper cap 24 is sealingly secured across the upper end 14 of the housing 12 and includes a fluid port 26 which forms the outlet from the fluid chamber 18. The outlet port 26, like the inlet port 22, is preferably threaded for connection with conventional fluid fittings.

A screen 28 constructed of perforated metal, interwoven strands or other suitable fluidly transparent material, is disposed diagonally across the interior housing chamber 18. The screen 28 is elliptical in shape when viewed in plan and forms a pair of subchambers 30 and 32, each of which is triangular in cross section. The subchamber 32 has its apex 34 adjacent the outlet end 14 of the housing 12 while, conversely, the base 36 of the subchamber 32 is open to and adjacent the inlet end 16 of the housing. A ball retainer 38 is also disposed transversely across the lower end of the subchamber 32 for a reason to be subsequently described.

At least one and preferably a plurality of spherical flow responsive members 40 are positioned within the subchamber 32 and thus entrapped between the strainer 38, the screen 28 and the housing 12. The retainer 38 prevents the members 40 from falling through the inlet port 22. The members 40 have a density greater than density of the fluid flowing through the flow meter and thus will normally gravitate to the lower end of the subchamber 32. However, fluid flow from the inlet 22 into the outlet 26 will urge the members upwardly within the subchamber 32 by an amount dependent upon both the density and the cross sectional area of the member 40 and the fluid flow rate. The members 40 can be of hollow construction, as shown at 40' or can be of solid construction.

Still referring to FIGS. 1 and 2, a switch 42 is fastened to the outer periphery of the housing 12 by a split ring 44 and a threaded fastener 46 which releaseably secures the free ends of the ring 44 together. The switch 42 abuts against the outer periphery of the housing 12 and along the subchamber 32. Moreover, the axial position of the switch 42 along the housing 12 can be readily adjusted by loosening the threaded fastener 46, axially repositioning the ring 44 and its attached switch 42, and then retightening the fastener 46.

The switch 42 is a magnetically operated switch which cooperates with a magnetic insert 48 secured to one or more of the members 40 or, alternatively, the entire member 40 can be made of a magnetic material. Consequently, when the member 40 with the magnetic insert 48 is positioned adjacent the switch 42, the magnetic insert 48 attracts and actuates the switch 42. Alternatively, of course, the magnetic switch 42 may itself contain a magnet while one or more of the members 40 is made of a ferric material. In this case, as the member 40 made of ferric material moves upwardly within the subchamber 32 to a position adjacent the switch 42, the magnetic switch is attracted to the member 40 and becomes actuated. The switch itself can be connected to an alarm system, a flow indicating means, or the like.

In operation, the fluid inlet 22 and fluid outlet 26 are connected to a suitable fluid system (not shown) and the axis of the housing 12 is vertically oriented with its upper end 14 above its lower end 16. Fluid flow through the flow meter then propels the members 40 upwardly in the subchamber 32 in a lineal amount dependent upon the fluid flow rate, density of the members 40 and cross sectional area of the members 40. For example, a higher fluid flow rate is required to elevate a relatively small and heavy member 40 up to a predetermined level within the subchamber 32 than would be required to propel lighter and/or larger member 40 to the same level within the subchamber 32. Moreover, as the members 40 are propelled upwardly within the subchamber 32 by the fluid flow, the screen 28 will urge the members 40 radially outwardly toward the housing 12 to both enhance their visability and to insure proper actuation of the switch 42.

A reduction in the flow rate, of course, permits the members 40 to settle toward the bottom of the housing chamber 18. When the member or the members 40 with the magnetic insert 48 are elevated adjacent the magnetic switch 42, the magnetic insert 48 activates the switch 42 and its associated electrical system (not shown). Since the elevation of the members 40 within the subchamber 32 is proportional to the flow rate through the flow meter 10, the flow rate at which the switch 42 is actuated can be simply and easily varied by merely axially shifting the position of the switch 42 along the outer periphery of the housing 12.

The flow range for the flow meter 10 can be simply and easily reset by merely changing the members 40 for different members 40 having different densities or surface areas. For example, if a relatively high flow range is required, relatively small and dense members would be used while, conversely, if a lower flow range is desired, relatively light and/or large members 40 are used.

Figure 3:
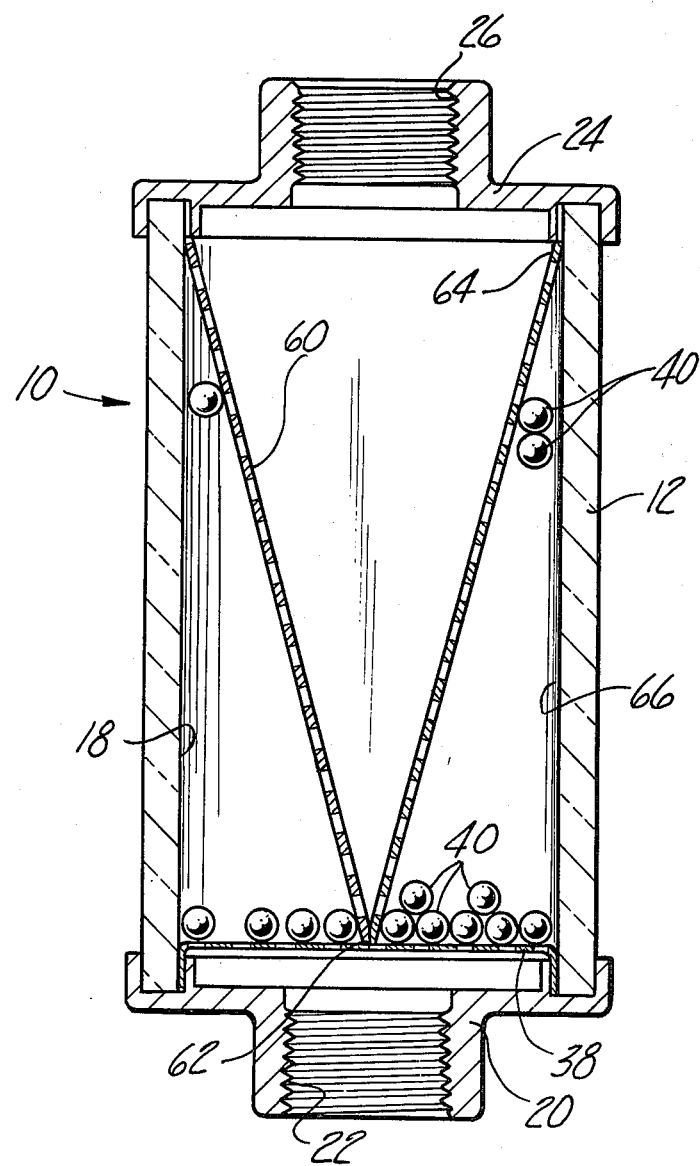
FIG. 3 is a longitudinal sectional view of the flow meter similar to FIG. 1 but showing a modification thereof and with parts removed for clarity.

With reference now to FIG. 3, a modification of the flow meter 10 is thereshown in which the screen 28 is replaced by a conical screen 60 having its apex 62 positioned at the inlet end of the housing chamber 18 and its base 64 positioned at and open to the outlet end of the housing chamber 18. The conical screen 60 thus defines a subchamber 66 between the outer periphery of the screen 60 and the housing 12. The flow responsive members 40 are positioned within this subchamber 66. Thus, as the members 40 rise within the subchamber 66 in response to fluid flow through the flow meter 10, the screen 60 forces the members radially outwardly toward the housing 12 to enhance their visability and to insure tripping of the magnetic switch 42 (FIG. 1). Unlike the flow meter shown in FIG. 1, however, the modification of the flow meter 10 shown in FIG. 3 forces the members 40 radially outwardly around the entire circumference of the housing 12 so that the fluid flow rate can be viewed from any side of the housing 12. If desired, appropriate indicia can be formed on the housing 12 which correlates to the fluid flow rate. Alternatively, the members 40 can be color coded or have indicia on them representative of the fluid flow rate.

From the foregoing, it can be seen that the fluid flow meter 10 according to the present invention provides a novel flow meter which is of simple and inexpensive construction. Moreover, unlike the previously known flow meters, the flow range for this flow meter can be simply and easily varied by merely substituting new flow responsive members 40 having different densities and/or surface areas. The flow meter 10 is further advantageous in that the fluid flow rate at which the switch 42 is activated can be simply and easily changed by merely repositioning the switch 42 along the outer periphery of the flow meter housing 12.

Having described my invention, however, many modifications thereto will become apparent to those skilled in the art to which it pertains without deviation from the spirit of the invention as defined by the scope of the appended claims.

I claim:

1. A fluid flow meter comprising:
   a housing having an interior chamber with an upper end and a lower end at least a portion of said housing being constructed of a transparent material;
   fluid inlet means fluidly connected to the lower end of the chamber,
   fluid outlet means fluidly connected to the upper end of the chamber,
   at least two flow responsive members disposed and freely movable within at least a portion of said chamber, said members having a density greater than the density of the fluid passing through the flow meter but vertically displaceable within said chamber in an amount proportional to the fluid flow rate through the flow meter,
   means for retaining said member in said chamber; and
   wherein said two members have different densities so that the vertical displacement of one member as a function of the fluid flow rate through the flow meter is different from the other member.

2. The invention as defined in claim 1 wherein at least one member is hollow.

3. The invention as defined in claim 1 wherein said chamber is elongated and wherein said retaining means comprises a screen extending diagonally across said chamber and forming a subchamber in which said member is disposed, said subchamber being generally triangular in cross section having its base adjacent the inlet means and its apex adjacent the outlet means, said screen forcing said member toward said transparent housing portion as said member rises in said subchamber.

4. The invention as defined in claim 1 wherein said chamber is elongated and wherein said retaining means comprises a substantially conical screen disposed in said chamber, said screen having its apex adjacent the lower end of the housing and its base adjacent the upper end of the housing and forming a subchamber between the outer periphery of said screen and the housing in which said member is positioned.

5. The invention as defined in claim 1 and further comprising switch means attached to said housing and means for actuating said switch means when said member reaches a predetermined level in said chamber.

6. The invention as defined in claim 5 wherein said switch means comprises a magnetically actuated switch and wherein said actuating means comprises a magnetic portion connected to said member.

7. The invention as defined in claim 5 and further comprising means for adjustably securing said switch means to said housing to thereby vary said predetermining level.

8. The invention as defined in claim 7 wherein said securing means comprises a split ring to which said switch is attached and a threaded fastener for securing the free ends of the split ring together.

9. The invention as defined in claim 1 wherein said housing comprises a cylindrical transparent tube, the interior of said tube forming said chamber.

10. A fluid flow meter comprising:
    a housing having an interior chamber with an upper end and a lower end at least a portion of said housing being constructed of a transparent material;
    fluid inlet means fluidly connected to the lower end of the chamber,
    fluid outlet means fluidly connected to the upper end of the chamber,
    at least one flow responsive member disposed and freely movable within at least a portion of said chamber, said member having a density greater than the density of the fluid passing through the flow meter but vertically displaceable within said chamber in an amount proportional to the fluid flow rate through the flow meter,
    means for retaining said member in said chamber, said retaining means comprising a screen disposed in said chamber and forming a subchamber between said screen and said transparent housing and in which said member is disposed, said screen being dimensioned so that said screen forces said member toward said transparent housing as said member rises in said subchamber.

11. The invention as defined in claim 10 wherein said screen extends diagonally across said chamber, said subchamber being generally triangular in cross section having its base adjacent the inlet means and its apex adjacent the outlet means.

12. The invention as defined in claim 10 wherein said screen is substantially conical in shape, said conical screen having its apex adjacent the lower end of the housing and its base adjacent the upper end of the housing.

* * * * *

UNITED STATES PATENT AND TRADEMARK OFFICE
CERTIFICATE OF CORRECTION

PATENT NO. : 4,281,554
DATED : August 4, 1981
INVENTOR(S) : Borje O. Rosaen

It is certified that error appears in the above—identified patent and that said Letters Patent is hereby corrected as shown below:

Column 1, line 33, delete "from" and insert -- flow --.

Signed and Sealed this

Thirteenth Day of October 1981

[SEAL]

Attest:

GERALD J. MOSSINGHOFF

Attesting Officer  Commissioner of Patents and Trademarks